United States Patent
Okamoto

(10) Patent No.: US 8,582,293 B2
(45) Date of Patent: Nov. 12, 2013

(54) PORTABLE ELECTRONIC APPARATUS

(75) Inventor: Kenjiro Okamoto, Daito (JP)

(73) Assignee: KYOCERA Corporation, Kyoto (JP)

( * ) Notice: Subject to any disclaimer, the term of this patent is extended or adjusted under 35 U.S.C. 154(b) by 64 days.

(21) Appl. No.: 13/282,400

(22) Filed: Oct. 26, 2011

(65) Prior Publication Data

US 2012/0106049 A1    May 3, 2012

(30) Foreign Application Priority Data

Oct. 27, 2010    (JP) ................................. 2010-240729

(51) Int. Cl.
*G06F 1/16*    (2006.01)
*G09G 5/00*    (2006.01)

(52) U.S. Cl.
USPC ............ 361/679.55; 361/679.04; 361/679.27; 361/679.56; 345/1.1; 345/1.3

(58) Field of Classification Search
USPC ........... 345/1.1, 1.3, 156, 157, 168, 169, 905; 361/679.01–679.45, 679.55–679.59; 455/575.1, 575.3, 575.4; 312/223.1, 312/223.2
See application file for complete search history.

(56) References Cited

U.S. PATENT DOCUMENTS

| | | | | |
|---|---|---|---|---|
| 5,900,848 | A * | 5/1999 | Haneda et al. .................. | 345/1.1 |
| 6,532,147 | B1 * | 3/2003 | Christ, Jr. .................. | 361/679.27 |
| 2003/0026068 | A1 * | 2/2003 | Tsai et al. ...................... | 361/683 |
| 2007/0164923 | A1 * | 7/2007 | Kanai et al. ..................... | 345/1.1 |
| 2010/0061054 | A1 * | 3/2010 | Ladouceur et al. ....... | 361/679.56 |
| 2010/0188350 | A1 | 7/2010 | Sawada | |
| 2010/0259463 | A1 * | 10/2010 | Sip et al. .......................... | 345/1.3 |
| 2011/0012858 | A1 * | 1/2011 | Brookes et al. ............... | 345/173 |
| 2012/0039028 | A1 * | 2/2012 | Choo et al. .............. | 361/679.01 |
| 2012/0212397 | A1 * | 8/2012 | Lock et al. ....................... | 345/1.3 |

FOREIGN PATENT DOCUMENTS

JP    2009-071588 A    4/2009

* cited by examiner

*Primary Examiner* — Jayprakash N Gandhi
*Assistant Examiner* — Nidhi Desai
(74) *Attorney, Agent, or Firm* — Procopio, Cory, Hargreaves & Savitch LLP

(57) ABSTRACT

A portable electronic apparatus includes a first casing having a display surface in its surface, a second casing having a display surface in its surface, a coupling mechanism adapted to couple the first casing and the second casing to each other to take at least two states which are a closed state where the display surface in the first casing is covered with a rear surface of the second casing and also the display surface in the second casing is exposed, and an open state where the second casing has been moved with respect to the first casing from the closed state, and the display surfaces in both the casings are exposed in the same plane.

4 Claims, 16 Drawing Sheets

(a)

(b)

(a)

(b)

(a)

(b)

(c)

(d)

(a)

(b)

PORTABLE ELECTRONIC APPARATUS

CROSS-REFERENCE TO RELATED APPLICATIONS

This application claims priority from Japanese Patent Application No. 2010/240729 filed on Oct. 27, 2010, which is hereby incorporated by reference.

BACKGROUND OF THE INVENTION

1. Field of the Invention

The present invention relates to portable electronic apparatuses constituted by a pair of casings coupled to each other.

2. Background Art

Conventionally, there have been known portable electronic apparatuses constituted by a pair of casings coupled to each other, such that both the casings are provided with respective display surfaces, thereby enabling both the display surfaces to offer larger amounts of information to users.

Such portable electronic apparatuses are adapted, for example, to allow both the casings to move with respect to each other, between a single-surface exposed state (a closed state) where the pair of casings are overlaid on each other, the lower casing (a first casing) is covered at its display surface (a first display surface) with the upper casing (a second casing), and only the display surface (a second display surface) in the second casing is exposed, and a double-surface exposed state where the second casing has been moved with respect to the first casing, and the display surfaces of both the casings are exposed.

In the double-surface exposed state, the second casing has been brought into an open state where the second display surface is flushed with the first display surface in the same plane.

In a portable electronic apparatus constituted by a first casing, a second casing and a coupling mechanism which couples the first and second casings to each other as described above, electronic components incorporated in the first casing and electronic components incorporated in the second casing are electrically connected to each other through a flexible lead.

In this case, the flexible lead extends from the inside of the first casing to the inside of the second casing through the inside of the coupling mechanism.

When both the casings are moved with respect to each other to take an open state and a closed state, the flexible lead extending to the inside of the second casing through the inside of the coupling mechanism is pulled along with the sliding of the second casing.

Therefore, a certain degree of leeway is provided in the length of the flexible lead, in order to prevent excessive forces from being exerted on the flexible lead. However, this increases the length of the flexible lead by an amount corresponding to the leeway, which may cause the flexible lead to be loosened more than necessary.

It is an object of the present invention to provide a portable electronic apparatus including a first casing, a second casing and a coupling mechanism which couples the first and second casings to each other to take a closed state and an open state and, further, including a sliding mechanism interposed between the coupling mechanism and the second casing for enabling the second casing to slide toward the first casing in the open state, the portable electronic apparatus being adapted to eliminate the necessity of providing a flexible lead extending from the inside of the first casing to the inside of the second casing through the inside of the coupling mechanism with looseness more than necessary.

SUMMARY OF THE INVENTION

A portable electronic apparatus according to the present invention includes a first casing having a display surface in its surface; a second casing having a display surface in its surface; a coupling mechanism adapted to couple the first casing and the second casing to each other to take at least two states which are a closed state where the display surface in the first casing is covered with a rear surface of the second casing and also the display surface in the second casing is exposed, and an open state where the second casing has been moved with respect to the first casing from the closed state, and the display surfaces in both the casings are exposed in the same plane; and a sliding mechanism adapted to slide the second casing with respect to the first casing within the same plane in the open state; wherein the coupling mechanism includes an abutting surface at a position which comes into contact with the second casing in the closed state, and the sliding mechanism includes an abutting receiving surface at a position which comes into contact with the abutting surface in the coupling mechanism at the open state.

DETAILED DESCRIPTION OF EMBODIMENTS

Figure 1:
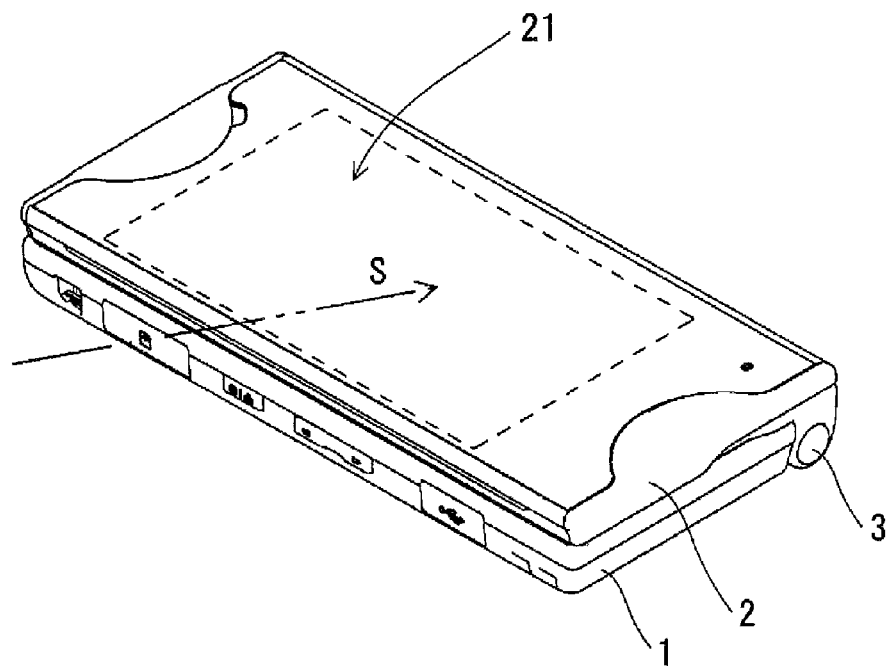
FIG. 1 is a perspective view illustrating a portable electronic apparatus according to an embodiment of the present invention, in a closed state.

A portable electronic apparatus according to an embodiment of the present invention includes a first casing 1 having a first display surface 11 in its surface, a second casing 2 having a second display surface 21 in its surface, and a coupling mechanism 3 which couples the first casing 1 and the second casing 2 to each other, as illustrated in FIGS. 1 to 8.

Further, the first display surface 11 and the second display surface 21 are capable of displaying, thereon, characters or videos, as well as images.

Figure 2:
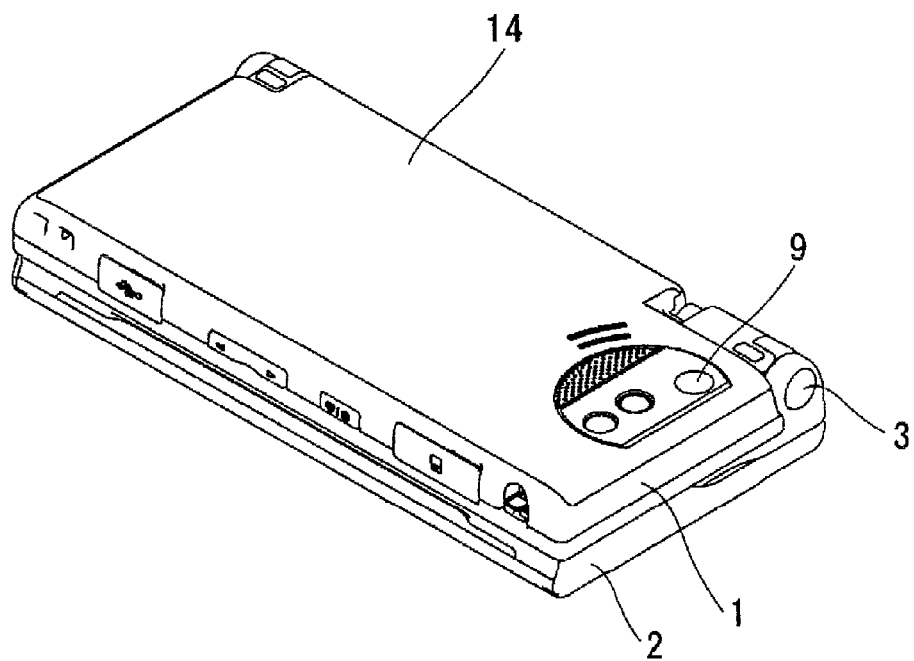
FIG. 2 is a perspective view illustrating the portable electronic apparatus in the closed state with being reversed.

As illustrated in FIG. 2, a photographing lens 9 is provided in the rear surface of the first casing 1.

Further, for identifying respective portions of the components of the portable electronic apparatus in the following description, "front (the side closer to the person viewing the figures)", "rear", "left" and "right" regarding the portable electronic apparatus illustrated in FIG. 1 when viewed along a user's line of sight indicated by an arrow S in the figure will be also referred to as "front", "rear", "left" and "right", regardless of the attitude of the portable electronic apparatus in the other drawings.

Figure 13:
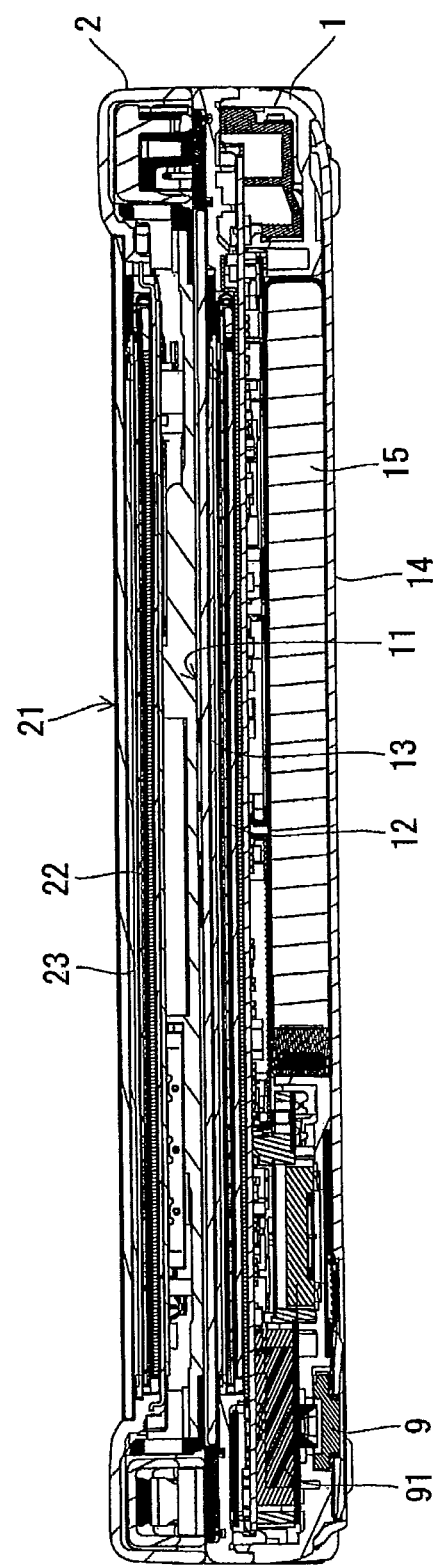
FIG. 13 is a cross-sectional view illustrating the portable electronic apparatus.

As illustrated in FIG. 13, inside the first casing 1, there are placed a first touch panel 13 and a first display 12 such that they face the first display surface 11, and, further, there is placed a camera 91 such that it faces the photographing lens 9. Further, the first casing 1 houses, therein, a battery 15, such that replacement of the battery 15 can be performed, by removing a battery lid 14.

On the other hand, inside the second casing 2, there are placed a second touch panel 23 and a second display 22, such that they face the second display surface 21.

Figure 3:
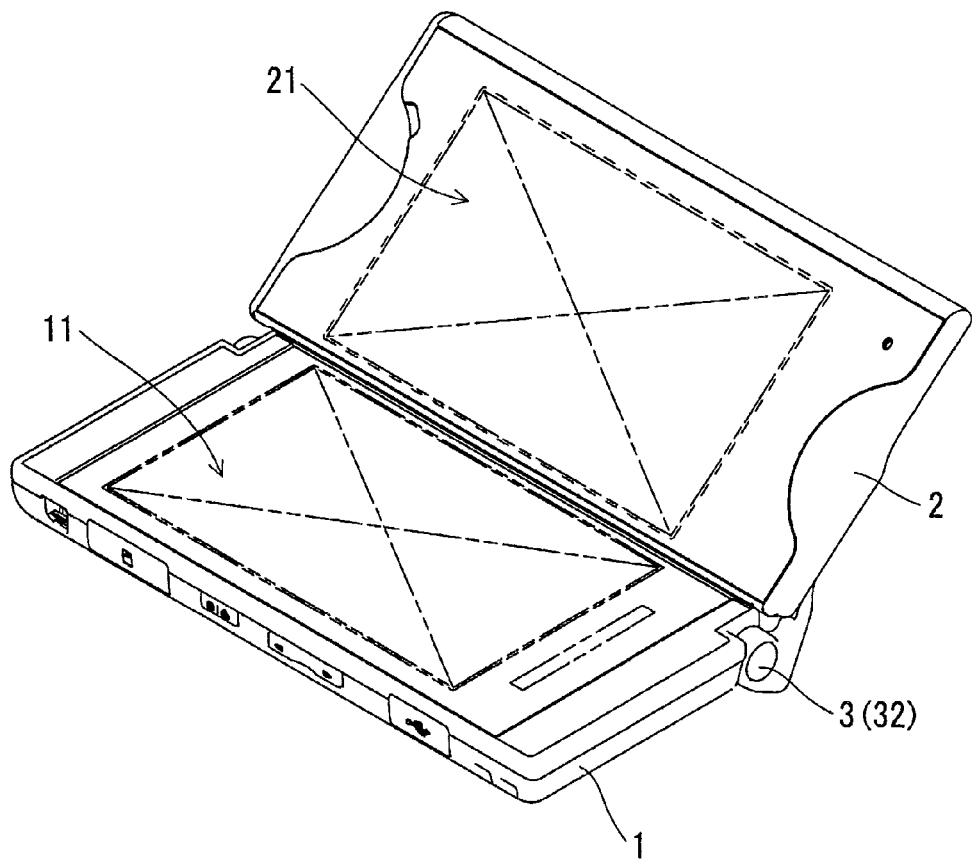
FIG. 3 is a perspective view illustrating the portable electronic apparatus, in a tilt state.
Figure 4:
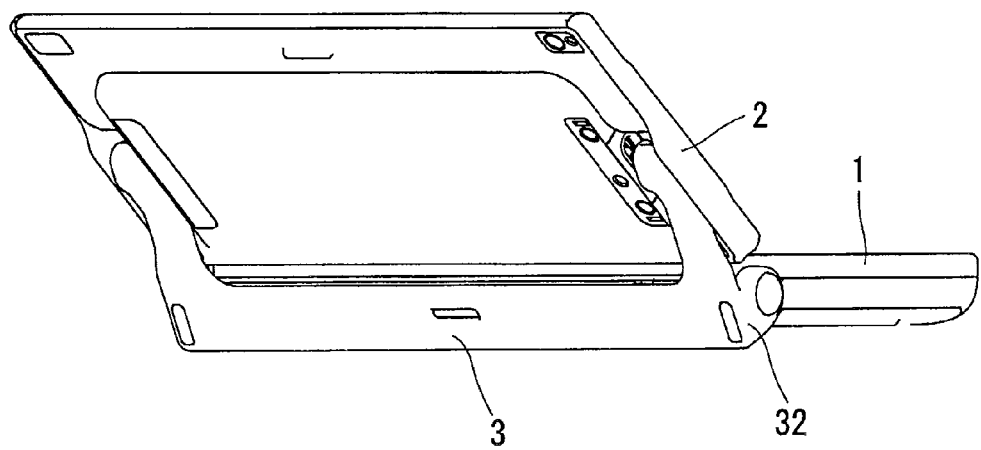
FIG. 4 is a perspective view illustrating the portable electronic apparatus, in the tilt state, when viewed at its rear side.
Figure 5:
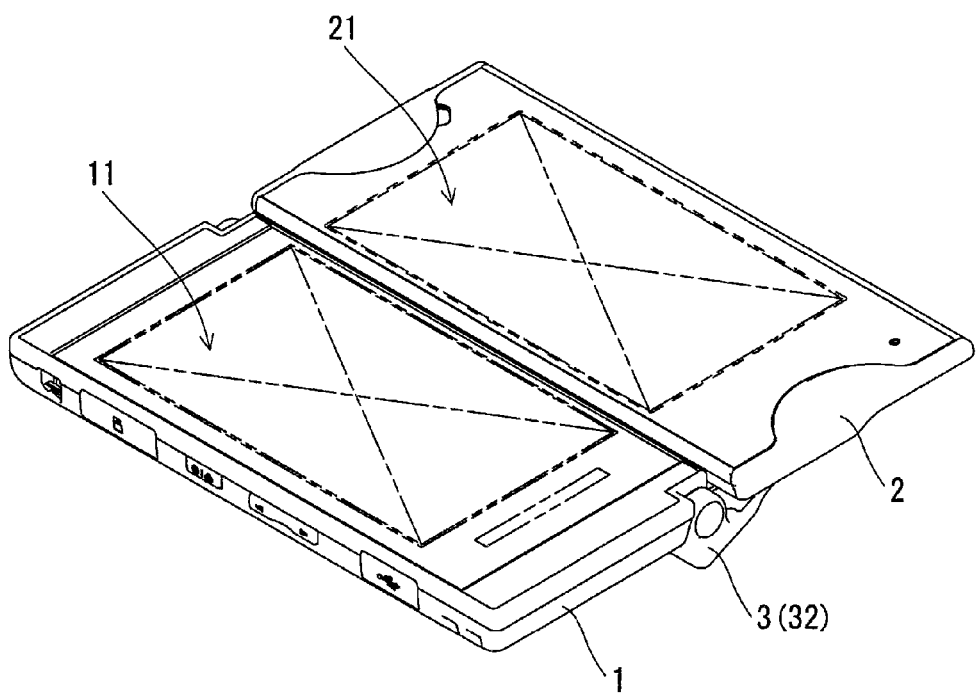
FIG. 5 is a perspective view illustrating the portable electronic apparatus in a first open state.
Figure 6:
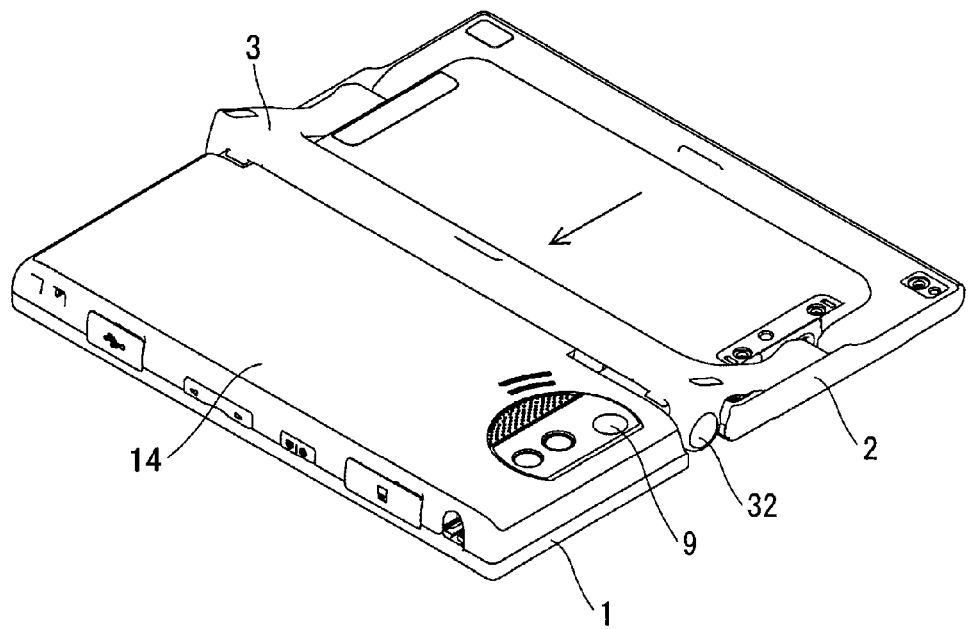
FIG. 6 is a perspective view illustrating the portable electronic apparatus in the first open state with being reversed.
Figure 7:
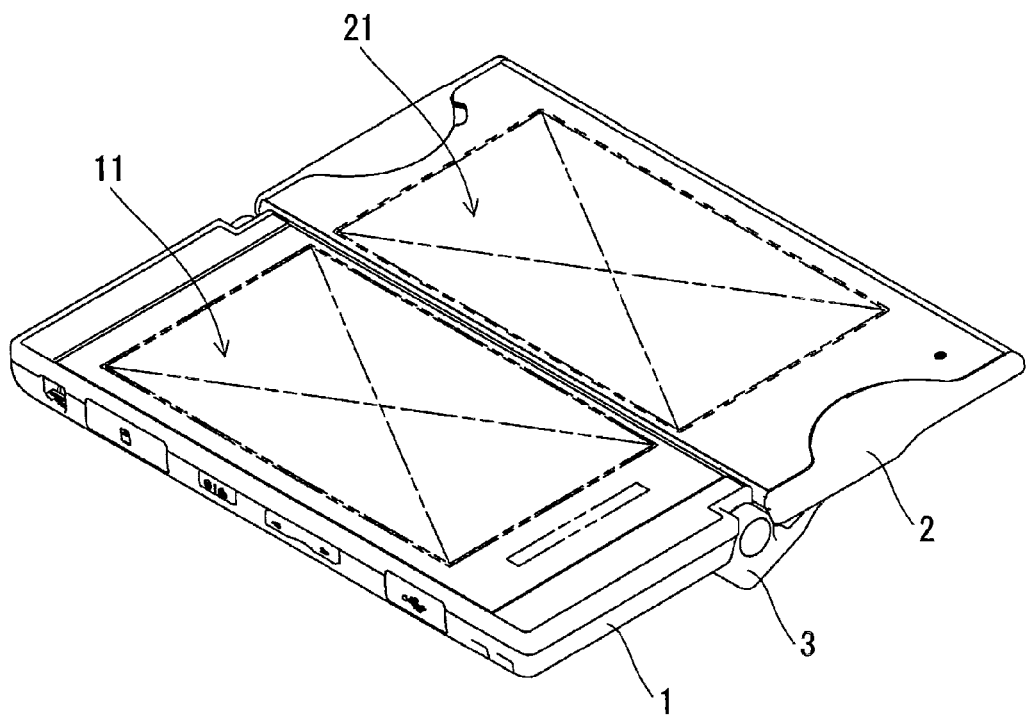
FIG. 7 is a perspective view illustrating the portable electronic apparatus in a second open state.
Figure 8:
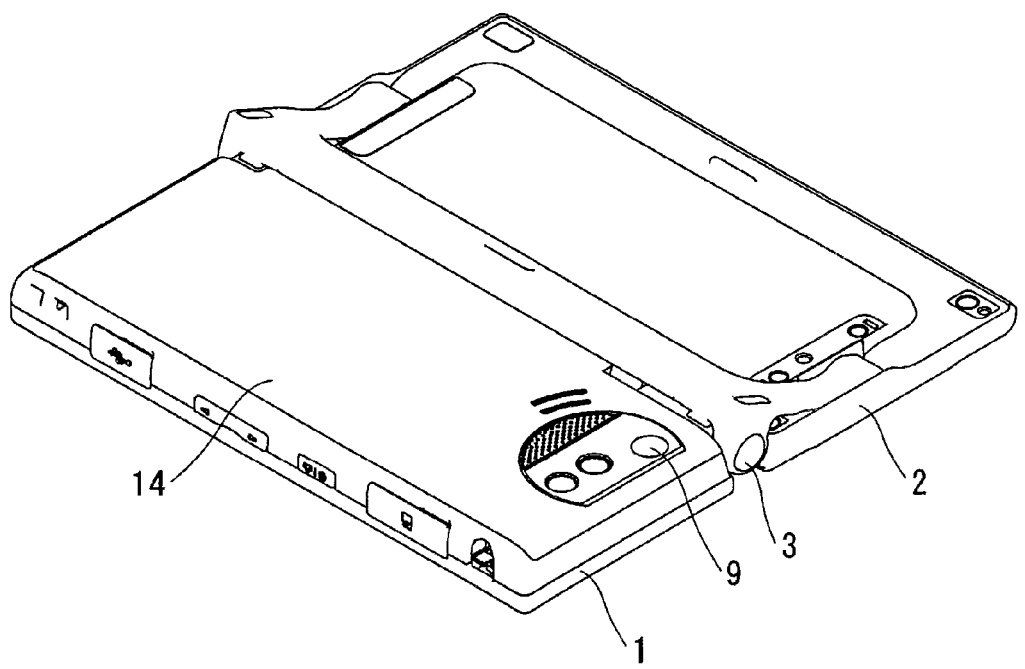
FIG. 8 is a perspective view illustrating the portable electronic apparatus in the second open state with being reversed.

The portable electronic apparatus according to the present invention is capable of being selectively set in four states as follows: a closed state where the first casing 1 is covered at its surface with the rear surface of the second casing 2 and, also, the surface of the second casing 2 is exposed as illustrated in FIG. 1 and FIG. 2; a tilt state where the second casing 2 has been rearwardly moved so that the surfaces of the both the casings 1 and 2 are exposed and, also, the surface of the second casing 2 is inclined with respect to the surface of the first casing 1 at an angle of opening which is equal to or more than 90 degrees but less than 180 degrees as illustrated in FIG. 3 and FIG. 4; a first open state where the second casing 2 has been rearwardly rotated so that the surfaces of both the casings 1 and 2 are exposed in the same plane as illustrated in FIG. 5 and FIG. 6; and a second open state where the second casing 2 has been slid toward the first casing 1 in a state where the surfaces of both the casings 1 and 2 are exposed in the same plane as illustrated in FIG. 7 and FIG. 8.

Figure 9:
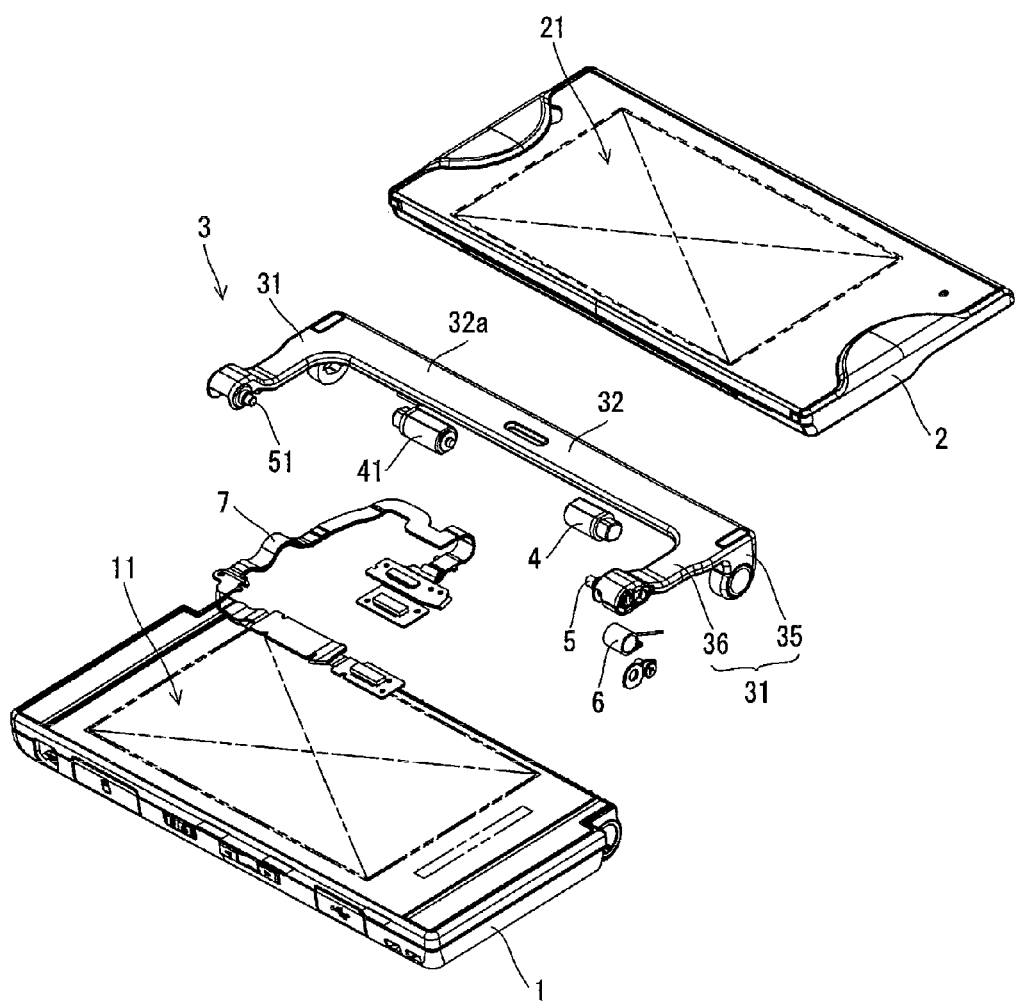
FIG. 9 is an exploded perspective view illustrating the portable electronic apparatus.
Figure 10:
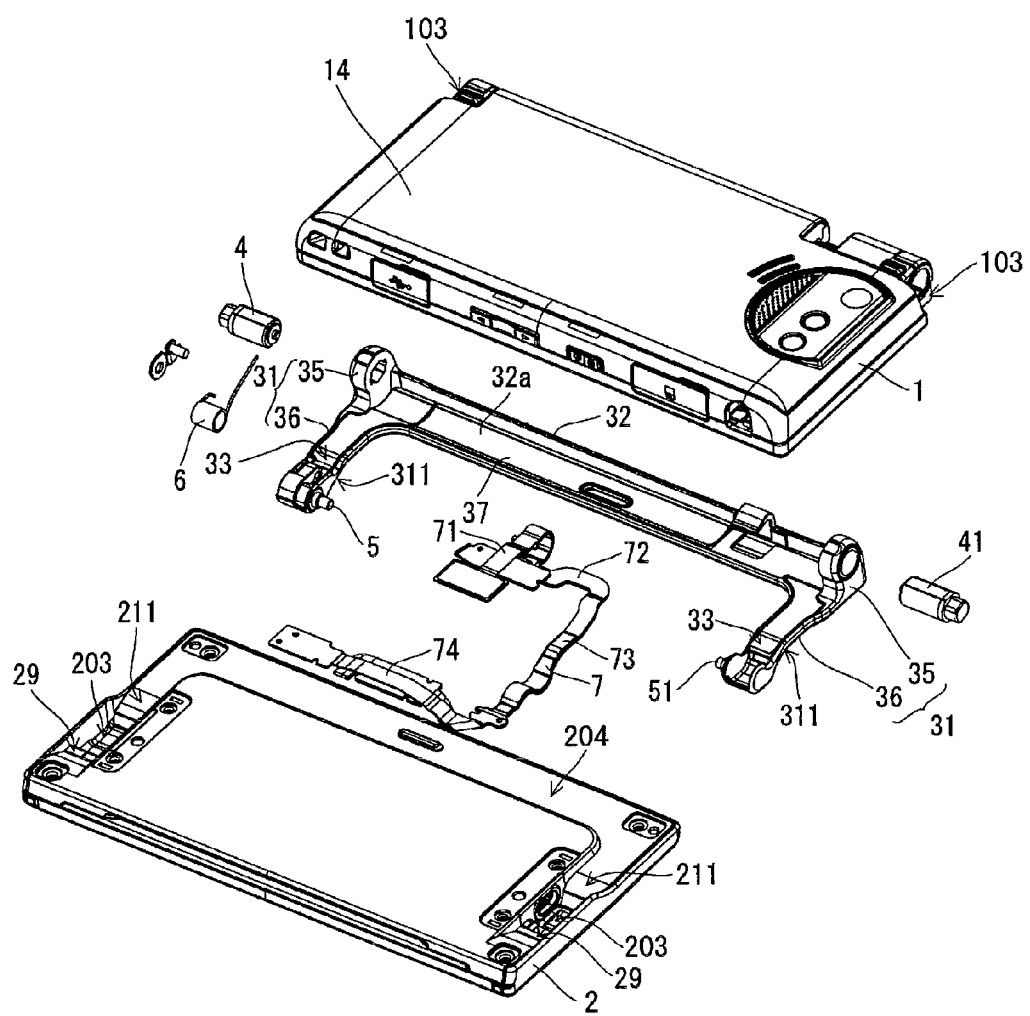
FIG. 10 is an exploded perspective view illustrating the portable electronic apparatus with being reversed.
Figure 11:
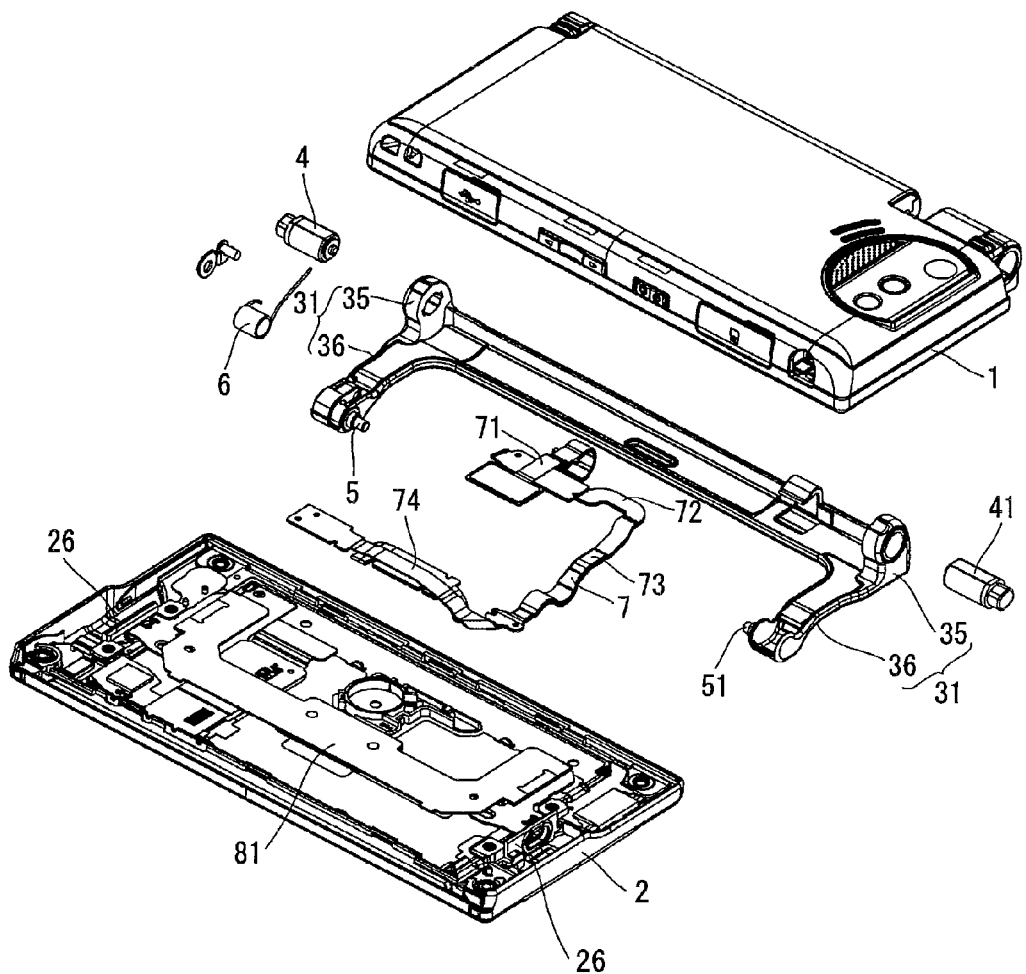
FIG. 11 is a perspective view illustrating the portable electronic apparatus, wherein a portion thereof is further exploded from the state of FIG. 10.

The coupling mechanism 3 which couples the first casing 1 and the second casing 2 to each other includes a U-shaped coupling member 32 constituted by an arm coupling portion 32a extending leftwardly and rightwardly, and a pair of left and right coupling arms 31 and 31 which extend in the forward and rearward directions and protrude from the opposite end portions of the arm coupling portion 32a, as illustrated in FIG. 9 and FIG. 10.

Each coupling arm 31 is of an L type which is bent in an L shape in a plane orthogonal to the display surfaces of both the casings and, also, is constituted by a first arm portion 35 and a second arm portion 36 which intersect with each other at the angular portion of the L shape.

The right coupling arm 31 is coupled, at its base end portion (the base end portion of the first arm portion 35), to the rear end portion of the right side surface of the first casing 1 through a well-known type hinge unit 4 incorporating a spring and a cam mechanism. The left coupling arm 31 is coupled, at its base end portion (the base end portion of the first arm portion 35), to the rear end portion of the left side surface of the first casing 1 through a dummy hinge unit 41 incorporating neither a spring nor a cam mechanism.

Further, the right coupling arm 31 is coupled, at its tip end portion (the tip end portion of the second arm portion 36), to the right end portion of the rear surface of the second casing 2 through a first hinge member 5. The left coupling arm 31 is coupled, at its tip end portion (the tip end portion of the second arm portion 36), to the left end portion of the rear surface of the second casing 2 through a second hinge member 51.

The hinge units 4 and 41 form a first pivot shaft which couples the base end portions of the coupling arms 31 to the first casing 1, while the hinge members 5 and 51 form a second pivot shaft which couples the tip end portions of the coupling arms 31 to the second casing 2, such that the first pivot shaft and the second pivot shaft are parallel to each other.

Further, the second arm portions 36 of the respective coupling arms 31 are provided with abutting surfaces 311 at their portions facing the second casing 2 and, also, the second casing 2 is provided with abutting receiving surfaces 211 to receive the abutting surfaces 311 in the closed state.

The electronic components incorporated in the first casing 1 and the electronic components incorporated in the second casing 2 are connected to each other through a flexible lead 7. The flexible lead 7 extends from the inside of the first casing 1 to the inside of the second casing 2 through the inside of a coupling arm 31. Further, the flexible lead 7 includes a first lead portion 71 housed within the first casing 1, a second lead portion 72 housed within the coupling arm 31, and a third lead portion 73 housed within the second casing 2.

Further, the length of the flexible lead 7 includes minimum necessary leeway which allows the first casing 1 and the second casing 2 to move relative to each other.

This allows the second casing 2 to perform a series of movements relative to the first casing 1 as illustrated in FIGS. 18A to D and FIGS. 19A to D.

In the tilt state illustrated in FIG. 3 and FIG. 4, the hinge unit 4 softly locks the coupling member 32 with respect to the first casing 1 and, also, biases the coupling member 32 toward the rotational angle of the tilt state, within a certain angle range centered at the rotational angle of the tilt state. Further, the hinge unit 4 biases the coupling member 32 toward the rotational angle of the first open state, within a certain angle range including the rotational angle of the first open state illustrated in FIG. 5 and FIG. 6.

Further, in the first open state illustrated in FIG. 5 and FIG. 6, the coupling member 32 is received by the first casing 1, so that the coupling member 32 is held at the rotational angle of the first open state.

Figure 19:
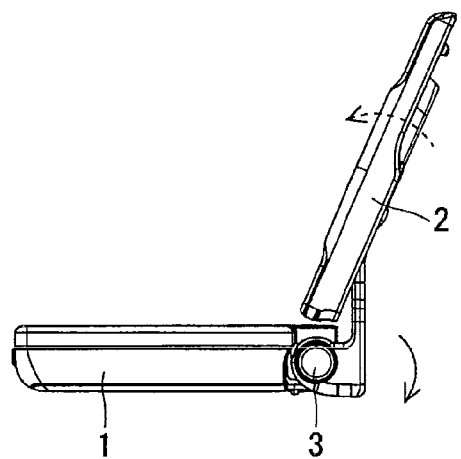
FIGS. 19A to D are a series of side views illustrating the second half of the same processing.
Figure 19:
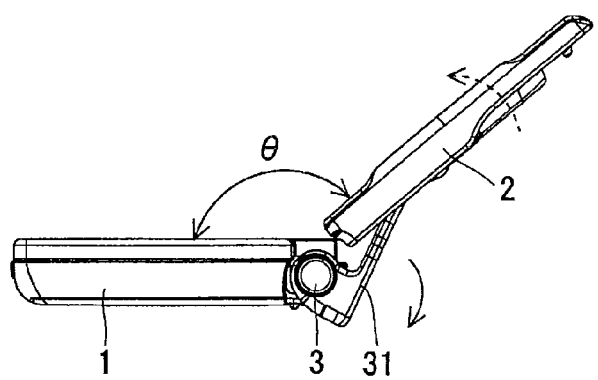
Figure 19:
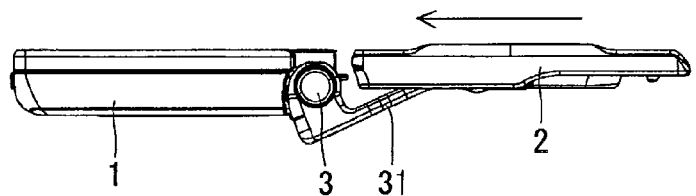
Figure 19:
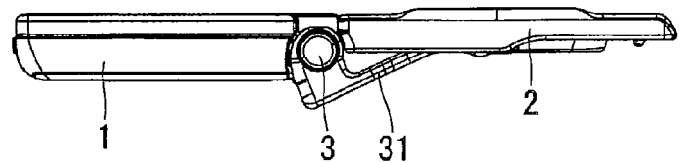

As illustrated in FIG. 9, a torsion spring 6 is mounted in the first hinge member 5 such that it is centered at the rotational shaft (the second pivot shaft) thereof, and the torsion spring 6 biases the second casing 2 in such a direction as to reduce the angle θ of opening in the tilt state illustrated in FIG. 19B.

Further, as illustrated in FIG. 10, the first casing 1 is provided, at the rear end portions of its opposite side surfaces, with housing portions 103 and 103 with concave shapes to house the first arm portions 35 and 35 of the coupling arms 31 and 31 of the coupling member 32.

On the other hand, the second casing 2 is provided, at the opposite side portions of its rear surface, with housing portions 204, 203 and 203 with concave shapes to house the arm coupling portion 37 and the second arm portions 36 and 36 of the coupling member 32.

Further, as illustrated in FIG. 10, both the coupling arms 31 and 31 of the coupling member 32 are provided with respective receiving surfaces 33 for receiving the second casing 2, at their portions facing the second casing 2 and, also, the second casing 2 is provided, at the opposite end portions of its rear surface, with respective sliding surfaces 29 to slidably come into contact with the receiving surfaces 33.

In the tilt state illustrated in FIG. 3 and FIG. 4 and in the first open state illustrated in FIG. 5 and FIG. 6, the sliding surfaces 29 in the second casing 2 come into contact with the receiving surfaces 33 in the coupling arm 31 to receive the rotation of the second casing 2 with respect to the coupling arms 31, so that the attitude of the second casing 2 with respect to the coupling arms 31 is defined in the tilt state and in the first open state.

Figure 12:
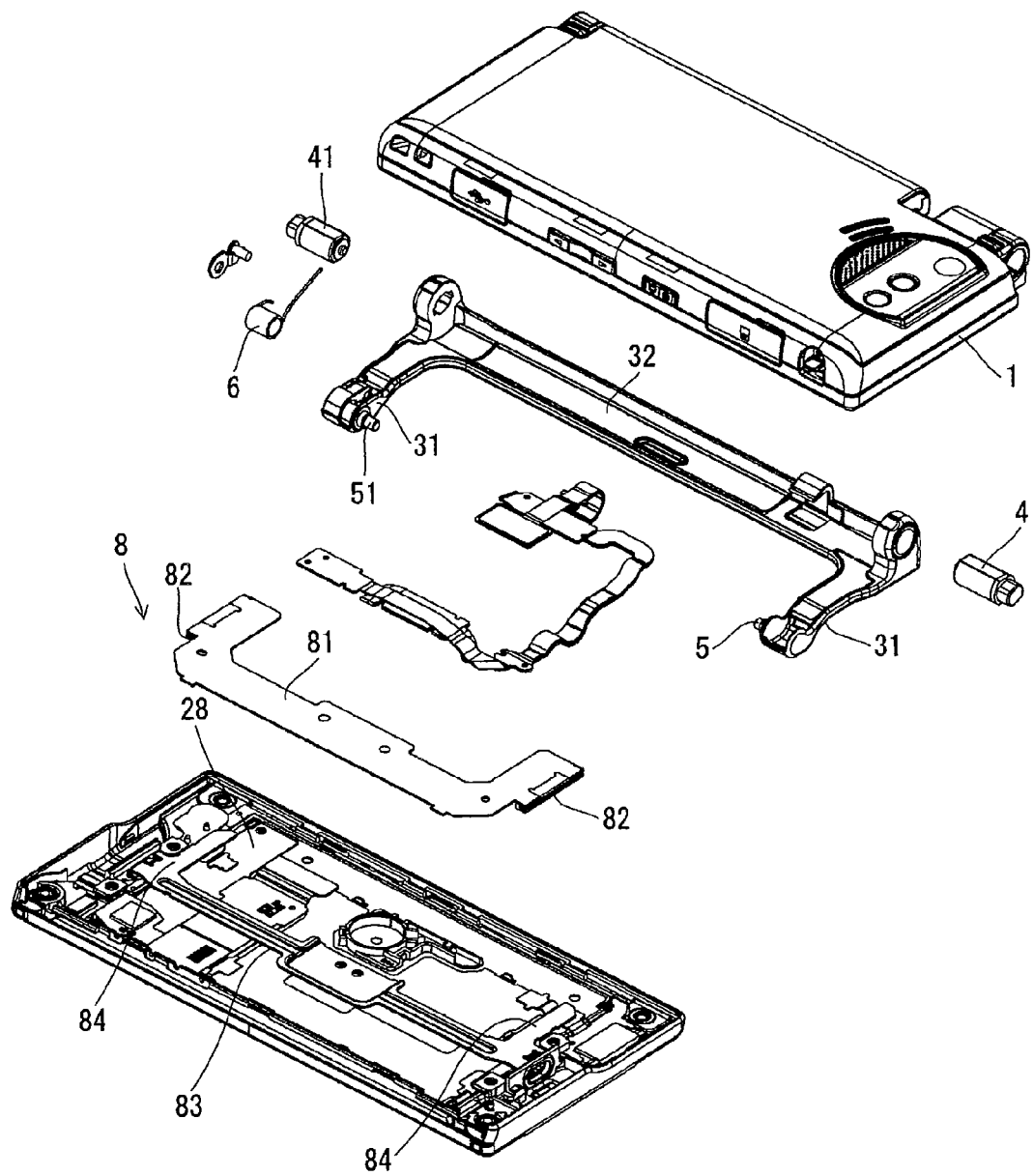
FIG. 12 is a perspective view illustrating the portable electronic apparatus, wherein a portion thereof is further exploded from the state of FIG. 11.
Figure 14:
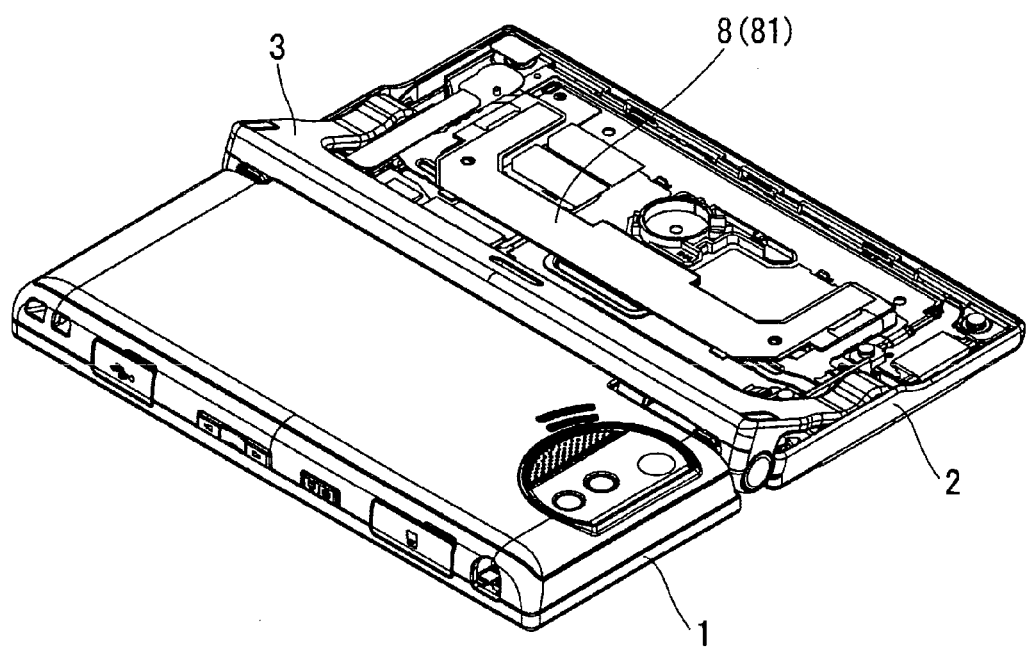
FIG. 14 is a perspective view illustrating the portable electronic apparatus, wherein a portion thereof is further exploded from the state of FIG. 8.

As illustrated in FIG. 12, on a sheet metal member 28 installed inside the second casing 2, there is provided a U-shaped sliding member 83 which is slidable forwardly and rearwardly and, also, there is fixed a U-shaped supporting member 81 such that it covers the sliding member 83 (see FIG. 14).

As illustrated in FIG. 12, the sliding member 83 is provided with arm portions 84 and 84 protruding from its opposite end portions in the left and right sides. Further, slidable guide members 82 and 82 are mounted to the supporting member 81 at its opposite end portions in the left and right sides.

Further, the arm portions 84 and 84 of the sliding member 83 are sandwiched between the sheet metal member 28 and the slidable guide members 82 and 82 of the supporting member 81, so that the sliding of the sliding member 83 in the forward and rearward directions on the sheet metal member 28 is guided.

The first hinge member 5 and the second hinge member 51 which have been described above are pivotally coupled, at their respective tip end portions, to the opposite side portions of the arm portions 84 and 84 of the sliding member 83.

Accordingly, there is structured a sliding mechanism 8 for sliding the second casing 2 in the forward and rearward directions with respect to the arm portions 84 and 84 of the sliding member 83, so that the second casing 2 is enabled to slide forwardly and rearwardly, between the first open state illustrated in FIG. 5 and FIG. 6 and the second open state illustrated in FIG. 7 and FIG. 8.

Figure 15:
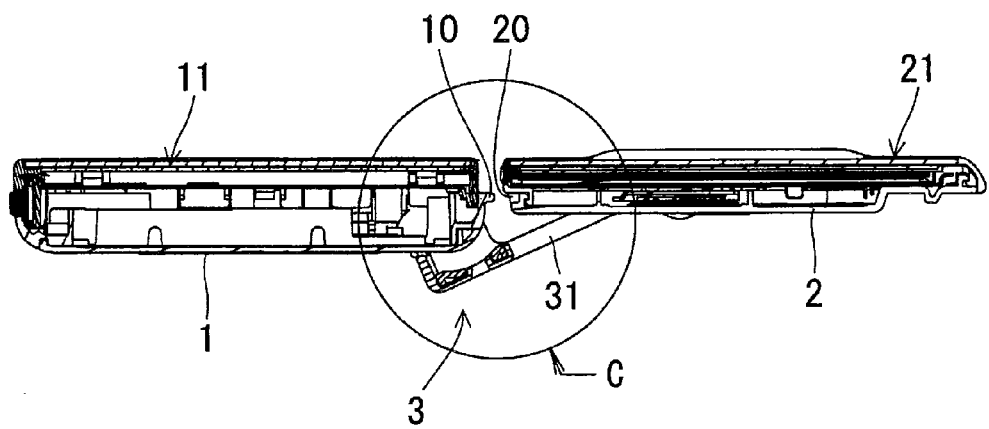
FIGS. 15A and B are another cross-sectional views illustrating the portable electronic apparatus, illustrating a transition from the first open state A to the second open state B.
Figure 15:
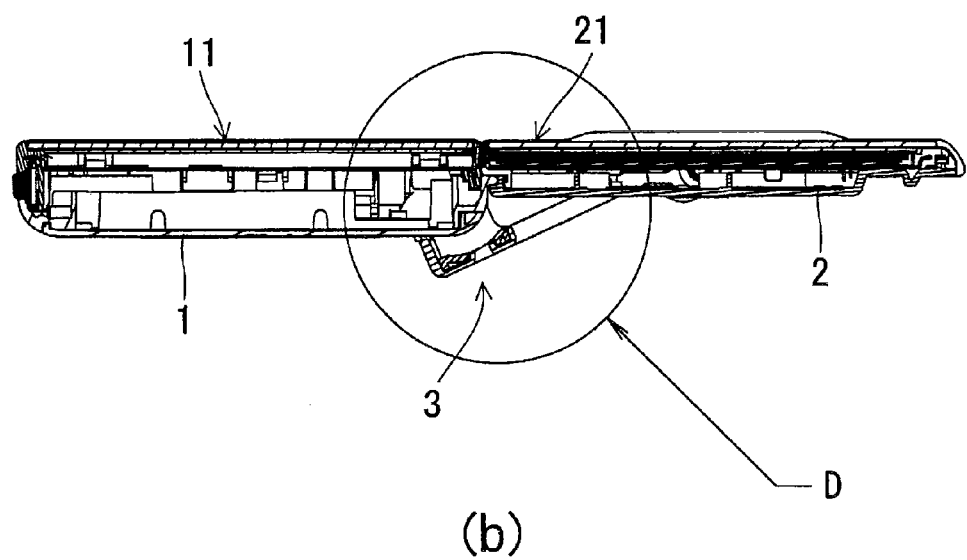
Figure 16:
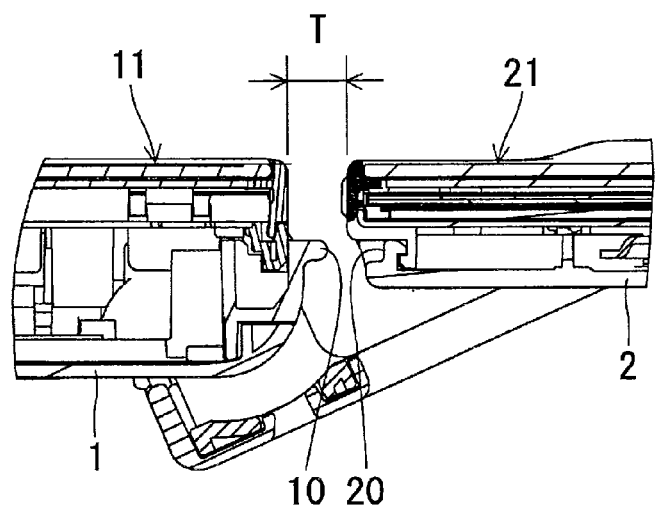
FIGS. 16A and B are cross-sectional views illustrating the portable electronic apparatus, by enlarging the portion C and the portion D in FIG. 15.
Figure 16:
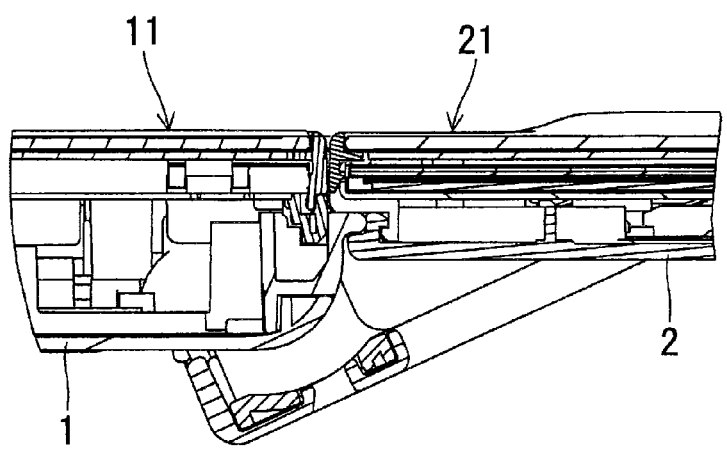

The rear end surface of the first casing 1 and the front end surface of the second casing 2, which are faced to each other in the first open state, are provided with a convex portion 10 and a concave portion 20, respectively, which can be engaged with and disengaged from each other, as illustrated in FIGS. 15A and B and FIGS. 16A and B. In the first open state illustrated in FIG. 15A and FIG. 16A, the convex portion 10 and the concave portion 20 are disengaged from each other, but in the second open state illustrated in FIG. 15B and FIG. 16B, the convex portion 10 and the concave portion 20 are engaged with each other.

As a result thereof, in the second open state illustrated in FIG. 15B and FIG. 16B, the first casing 1 and the second casing 2 are coupled to each other through the engagement between the convex portion 10 and the concave portion 20, so that they are maintained at a state where the first display surface 11 and the second display surface 21 are flushed with each other in the same plane.

In the first open state illustrated in FIG. 15A and FIG. 16A, a gap T with a sufficient size (for example, several millimeters) is provided between the first casing 1 and the second casing 2. However, in the second open state illustrated in FIG. 15B and FIG. 16B, the first casing 1 and the second casing 2 come into contact with each other or are faced to each other with a small interval (for example, 0.1 mm) interposed therebetween.

The portable electronic apparatus is capable of being selectively set in four states as follows: the closed state where the first casing 1 and the second casing 2 are overlaid on each other such that only the second display surface 21 is exposed as illustrated in FIG. 1 and FIG. 2; the tilt state where the second casing 2 has been rearwardly moved from the closed state so that both the first display surface 11 and the second display surface 21 are exposed and, also, the second display surface 21 is inclined with respect to the first display surface 11 at an angle of opening which is equal to or more than 90 degrees but less than 180 degrees as illustrated in FIG. 3 and FIG. 4; the first open state where the second casing 2 has been rearwardly rotated from the tilt state so that both the first display surface 11 and the second display surface 21 are exposed in the same plane as illustrated in FIG. 5 and FIG. 6; and the second open state where the second casing 2 has been slid toward the first casing 1 from the first open state, and both the display surfaces 11 and 21 are exposed in the same plane at positions where the first display surface 11 and the second display surface 21 are closer to each other as illustrated in FIG. 7 and FIG. 8.

In the closed state illustrated in FIG. 1 and FIG. 2, the first arm portions 35 and 35 of the coupling arms 31 and 31 are housed in the housing portions 103 and 103 in the first casing 1 illustrated in FIG. 10 and, also, the arm coupling portion 37 and the second arm portions 36 and 36 of the coupling member 32 are housed in the housing portions 204, 203 and 203 in the second casing 2, so that the coupling mechanism 3 is not protruded from the opposite side surfaces and the rear end surfaces of both the casings 1 and 2 and, thus, the entire apparatus is compacted.

In any of the tilt state illustrated in FIG. 3, the first open state illustrated in FIG. 5 and the second open state illustrated in FIG. 7, the coupling mechanism 3 is hidden substantially in its entirety behind the rear surfaces of both the casings 1 and 2 and, therefore, it is hard to view the protruding portion of the coupling mechanism 3 along an usual user's line of sight (an arrow S in FIG. 1).

Figure 18:
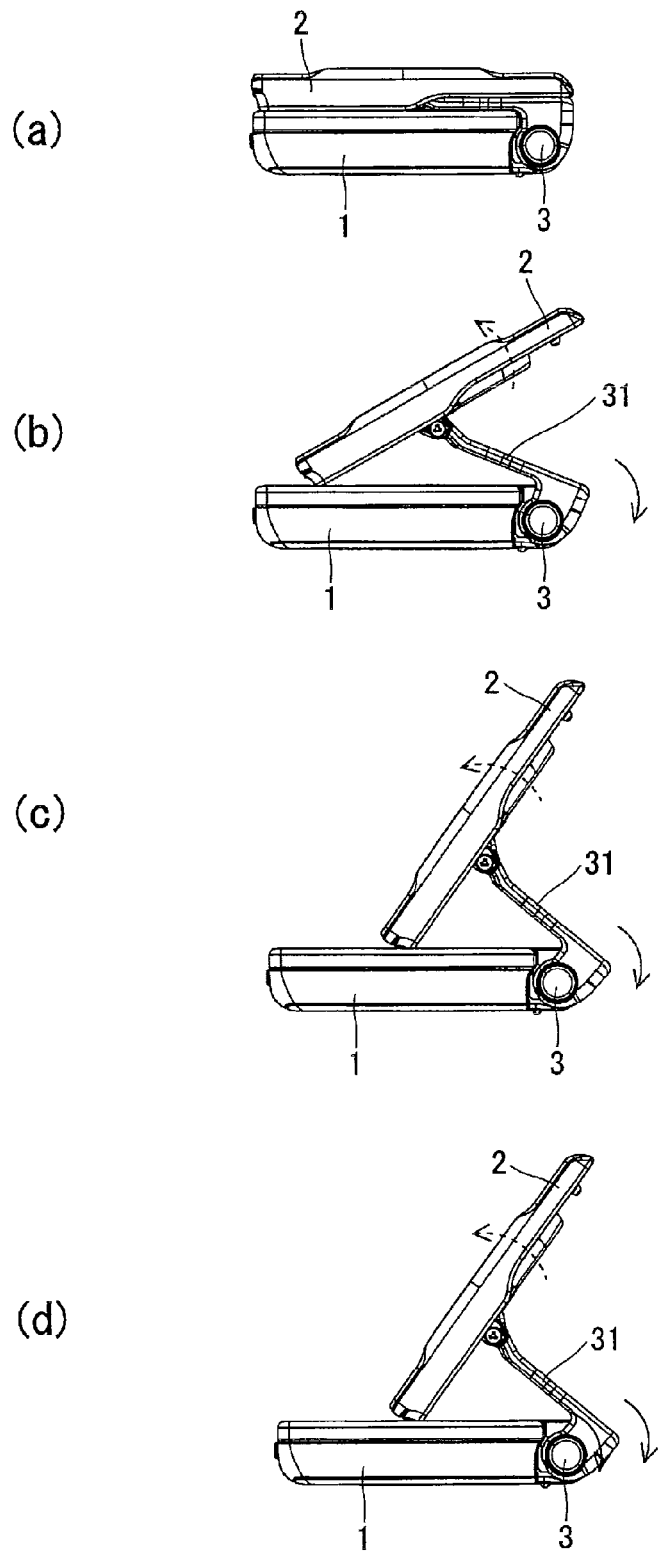
FIGS. 18A to D are a series of side views illustrating the first half of processing for transitions of the portable electronic apparatus according to the present invention from the closed state to the second open state through the tilt state.

As illustrated in FIGS. 23A to D and FIGS. 19A to D, in processing for shifting the portable electronic apparatus from the closed state to the second open state through the tilt state and the first open state, if the second casing 2 is pushed rearwardly to be slightly moved from the closed state illustrated in FIG. 18A, the second casing 2, thereafter, is rotated in the counterclockwise direction as indicated by a broken-line arrow due to the biasing by the torsion spring 6 and, along therewith, the coupling arms 31 are rotated in the clockwise direction as indicated by a solid-line arrow, as illustrated in B to D in the same figure.

Thus, the second casing 2 is rearwardly moved, while the second display surface 21 is kept oriented upwardly or obliquely upwardly.

Further, at a time point slightly after the state of FIG. 18D, the coupling arms 31 are further rotated in the clockwise direction, due to the biasing by the hinge unit 4, as in FIG. 19A, and, then, are softly locked at the rotational angle of the tilt state as in B in the same figure. Further, the second casing 2 is rotated in the counterclockwise direction due to the biasing by the torsion spring 6 and is held at the attitude in the tilt state illustrated in FIG. 19B since the sliding surfaces 29 comes into contact with the receiving surfaces 33 in the coupling arms 31.

Accordingly, if the user merely pushes the second casing 2 rearwardly at the closed state illustrated in FIG. 18A to slightly move it, then, the second casing 2 automatically moves to the tilt state illustrated in FIG. 19B.

Next, if the second casing 2 is pushed rearwardly to slightly rotate the coupling arms 31 in the clockwise direction in the tilt state illustrated in FIG. 19B, then the coupling arms 31 are rotated to the rotational angle of the first open state illustrated in FIG. 19C due to the biasing by the hinge unit 4 and are received by the first casing 1 at this rotational angle, while the sliding surfaces 29 in the second casing 2 are kept in contact with the receiving surfaces 33 in the coupling arms 31.

Along with this rotation of the coupling arms 31, the second casing 2 is rearwardly rotated and, finally, the first display surface 11 and the second display surface 21 are aligned in the same plane.

Further, if the second casing 2 is pulled toward the first casing 1 in the first open state illustrated in FIG. 19C, the sliding surfaces 29 in the second casing 2 slide on the receiving surfaces 33 in the coupling arms 31, so that the second casing 2 horizontally moves to a second open position illustrated in FIG. 19D and, finally, comes into contact with the first casing 1.

As a result thereof, as illustrated in FIG. 7, the first display surface 11 and the second display surface 21 get closer to each other, so that both the display surfaces 11 and 21 form a single large screen.

In the second open state, as illustrated in FIG. 15B, the convex portion 10 in the first casing 1 and the concave portion 20 in the second casing 2 are engaged with each other, so that both the casings 1 and 2 are coupled to each other. Accordingly, even if an operation for strongly touching the second display surface 21 is performed in this state, the second casing 2 is maintained at a certain attitude with respect to the first casing 1.

Figure 17:
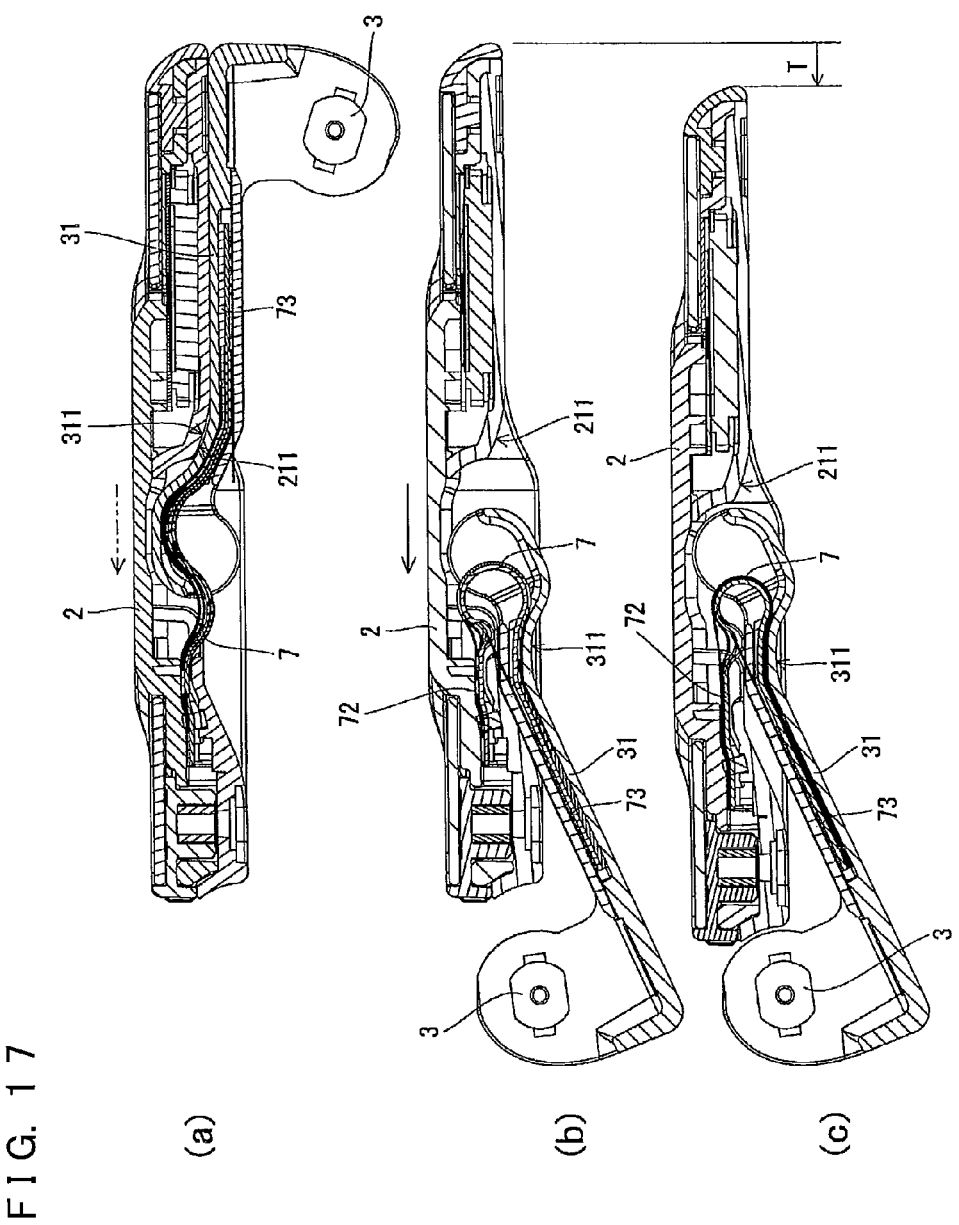
FIGS. 17A to C are cross-sectional views illustrating states of deformations of a flexible lead during processing for transitions from the closed state A to the second open state C through the first open state B.

FIGS. 17A to C illustrate states of deformations and bendings of the flexible lead 7, during processing for transitions from the closed state to the second open state through the first open state.

In the closed state illustrated in FIG. 17A, as described above, the abutting surfaces 311 formed in the second arm portions 36 of the coupling arms 31 and the abutting receiving surfaces 211 formed in the second casing 2 come into contact with each other, so that the second casing 2 is prevented from sliding in the direction indicated by a two-dot-chain line arrow.

Next, in the first open state illustrated in FIG. 17B, along with the rotation of the coupling arms 31, the flexible lead 7 is largely deformed and bent, between the first lead portion 72 and the third lead portion 73.

Further, if the second casing 2 is slid forwardly (leftwardly in the figure) by a distance T from the state illustrated in FIG. 17B as indicated by an arrow in the figure, this realizes the second open state illustrated in FIG. 17C. During this processing, the flexible lead 7 is forwardly displaced, by increasing the curvature in its bending portion between the second lead portion 72 and the third lead portion 73.

In the portable electronic apparatus, in the closed state illustrated in FIG. 17A, the second casing 2 is prevented from moving in the direction indicated by the chain-line arrow in the figure, which enables reduction of the length of the flexible lead 7 by a length corresponding to leeway which would be required to be provided in the flexible lead 7 if the second casing 2 were allowed to slide through an operation of the slide mechanism 8.

This enables forming the flexible lead 7 by determining the length thereof in consideration of only the deformations and bendings of the flexible lead 7 along with the rotation of the coupling arms 31 illustrated in FIGS. 17A to C. This enables suppressing the looseness of the flexible lead 7 in the closed state illustrated in FIG. 17A to a minimum necessary amount.

Figure 20:
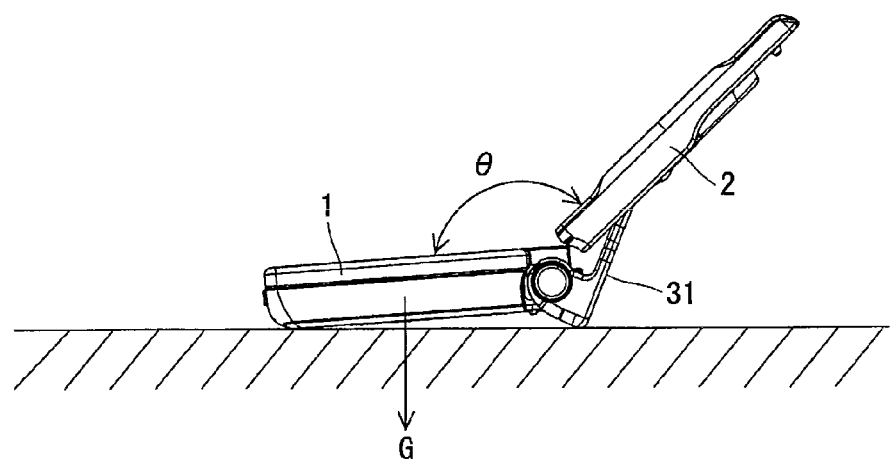
FIGS. 20A and B are side views illustrating the portable electronic apparatus according to the present invention being placed on a desk, in the tilt state A and in the second open state B.
Figure 20:
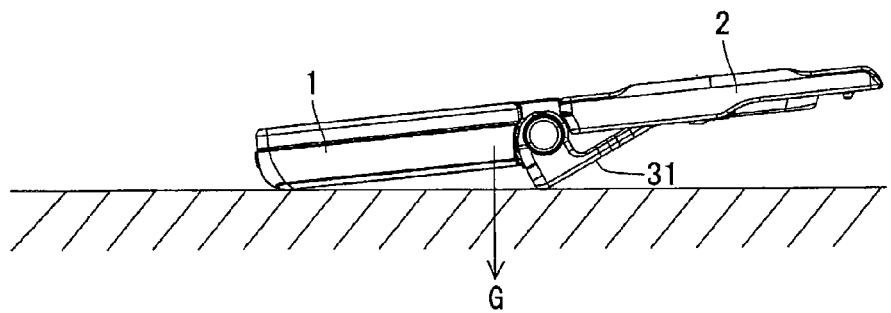

When the portable electronic apparatus is placed on a desk in the tilt state as illustrated in FIG. 20A or when it is placed on a desk in the second open state as illustrated in FIG. 20B, the angular portions of the coupling arms 31 are protruded from the rear surface of the first casing 1, so that the front end portion of the first casing 1 and the angular portions of the coupling arms 31 are grounded.

In this case, the L shape of the coupling arms 31 and the placement of the components with respect to the first casing 1 and the second casing 2 are designed, such that the center of gravity G is positioned in the first casing 1 side with respect to the grounded points of the coupling arms 31 as illustrated in the figure, in any state. This enables stabilization of the attitudes of both the casings 1 and 2.

Accordingly, when it is placed on a desk in the tilt state as illustrated in FIG. 20A, it is possible to operate the touch panel 13 in the first casing 1 in the front side, while viewing the display 12 in the second casing 2 in the rear side.

Further, when it is placed on a desk in the second open state as illustrated in FIG. 20B, both the display surfaces 11 and 21 take such attitudes as to be slightly oriented toward the user depending on the amount of the protrusion of the angular portions of the coupling arms 31 and, for example, both the display surfaces 11 and 21 form a single screen, which enables viewing images on the large screen. In this case, both the display surfaces 11 and 21 are sufficiently close to each other, which enables displaying images with substantially no discontinuities, on both the display surfaces 11 and 21.

What is claimed is:

1. A portable electronic apparatus comprising:
   a first casing having a display surface in its surface;
   a second casing having a display surface in its surface;
   a coupling mechanism adapted to couple the first casing and the second casing to each other to take at least two states which are a closed state where the display surface in the first casing is covered with a rear surface of the second casing and also the display surface in the second casing is exposed, and an open state where the second casing has been moved with respect to the first casing from the closed state, and the display surfaces in both the casings are exposed in the same plane; and
   a sliding mechanism adapted to slide the second casing with respect to the first casing within the same plane in the open state;

wherein the coupling mechanism includes an abutting surface at a position which comes into contact with the second casing in the closed state, and the sliding mechanism includes an abutting receiving surface at a position which is in contact with the abutting surface in the coupling mechanism in the closed state and is out of contact with the abutting surface in the open state.

2. The portable electronic apparatus according to claim 1, wherein the coupling mechanism includes a coupling arm which is coupled at its base end portion to the first casing through a first pivot shaft and also is coupled at its tip end portion to the second casing through a second pivot shaft parallel to the first pivot shaft and is allowed to rotate between a rotational angle in the closed state and a rotational angle in the open state, the coupling arm includes a receiving surface adapted to slidably come into contact with the second casing in the open state, the second casing includes a sliding surface adapted to slidably come into contact with the receiving surface in the coupling arm in the open state, and the sliding mechanism includes a sliding member which is slidably placed in the second casing, such that the coupling arm is pivotally supported at its tip end portion on the sliding member.

3. The portable electronic apparatus according to claim 1, wherein the abutting receiving surface is provided with the rear surface of the second casing.

4. A portable electronic apparatus comprising:

a first casing having a display surface in its surface;

a second casing having a display surface in its surface;

a coupling mechanism adapted to couple the first casing and the second casing to each other to take at least two states which are a closed state where the display surface in the first casing is covered with a rear surface of the second casing and also the display surface in the second casing is exposed, and an open state where the second casing has been moved with respect to the first casing from the closed state, and the display surfaces in both the casings are exposed in the same plane;

a sliding mechanism adapted to slide the second casing with respect to the first casing within the same plane in the open state;

wherein the coupling mechanism includes an abutting surface at a position which comes into contact with the second casing in the closed state, the sliding mechanism includes an abutting receiving surface at a position which is in contact with the abutting surface in the coupling mechanism in the closed state, the coupling mechanism includes a coupling arm which is coupled at its base end portion to the first casing through a first pivot shaft and also is coupled at its tip end portion to the second casing through a second pivot shaft parallel to the first pivot shaft and is allowed to rotate between a rotational angle in the closed state and a rotational angle in the open state, the coupling arm includes a receiving surface adapted to slidably come into contact with the second casing in the open state, the second casing includes a sliding surface adapted to slidably come into contact with the receiving surface in the coupling arm in the open state, and the sliding mechanism includes a sliding member which is slidably placed in the second casing, such that the coupling arm is pivotally supported at its tip end portion on the sliding member.

\* \* \* \* \*